United States Patent [19]

Sommer et al.

[11] Patent Number: 4,492,653

[45] Date of Patent: Jan. 8, 1985

[54] WATER-SOLUBLE TRISAZO DYESTUFFS ON THE BASIS OF A COMBINATION OF NAPHTHALENE-, DIPHENYLAMINE- AND PYRAZOLONE DERIVATIVES

[75] Inventors: Karl Sommer, Königstein; Norbert Armbrecht, Sulzbach, both of Fed. Rep. of Germany

[73] Assignee: Hoechst Aktiengesellschaft, Frankfurt am Main, Fed. Rep. of Germany

[21] Appl. No.: 410,621

[22] Filed: Aug. 23, 1982

[30] Foreign Application Priority Data

Aug. 25, 1981 [DE] Fed. Rep. of Germany ....... 3133552

[51] Int. Cl.³ .................... C09B 31/02; C09B 33/22; D06P 3/30; D06P 3/32
[52] U.S. Cl. .................... 534/796; 534/797; 534/876
[58] Field of Search ........................ 260/159

[56] References Cited

U.S. PATENT DOCUMENTS 1,615,551 1/1927 Oesch .................... 260/159
1,863,792 6/1932 Hentrich et al. .................... 260/159
2,264,681 12/1941 Rossander et al. ............. 260/159 X Primary Examiner—Floyd D. Higel
Attorney, Agent, or Firm—Curtis, Morris & Safford

[57] ABSTRACT

Water soluble trisazo dyestuffs of the formula

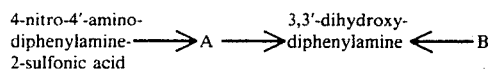

in which A is 1-amino-8-naphthol-3,6-disulfonic acid or 1-amino-8-naphthol-4,6-disulfonic acid, or a mixture of these two compounds, and B is 1-(3'- or 4'-aminophenyl)-3-methyl-5-pyrazolone, a process for their manufacture by diazotizing component A and coupling it with 3,3'-dihydroxy-diphenylamine to give a monoazo dyestuff, reacting this dyestuff with diazotized component B to give a disazo dyestuff, and converting this dyestuff to the trisazo dyestuff by uniting it with diazotized 4-nitro-4'-amino-diphenylamine-2-sulfonic acid, or by operating as described while, however, changing the sequence of reaction of component B and 4-nitro-4'-amino-diphenylamine-2-sulfonic acid, and use of these dyestuffs for the dyeing of leather and fur.

1 Claim, No Drawings

WATER-SOLUBLE TRISAZO DYESTUFFS ON THE BASIS OF A COMBINATION OF NAPHTHALENE-, DIPHENYLAMINE- AND PYRAZOLONE DERIVATIVES

This invention provides novel trisazo dyestuffs of the formula

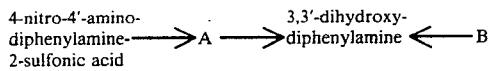

in which A is 1-amino-8-naphthol-3,6-disulfonic acid or 1-amino-8-naphthol-4,6-disulfonic acid, or a mixture of these two compounds, and B is 1-(3'- or 4'-aminophenyl)-3-methyl-5-pyrazolone, a process for the manufacture thereof, and their use for the dyeing of leather and fur. These dyestuffs are manufactured by diazotizing component A and coupling it with 3,3'-dihydroxy-diphenylamine to give a monoazo dyestuff, reacting this dyestuff with diazotized component B to give a disazo dyestuff, and converting this dyestuff to the trisazo dyestuff by uniting it with diazotized 4-nitro-4'-amino-diphenylamine-2-sulfonic acid, or by operating as described while, however, changing the sequence of reaction of component B and 4-nitro-4'-amino-diphenylamine-2-sulfonic acid.

The trisazo dyestuffs obtained according to the invention are readily water-soluble and especially suitable for dyeing leather and fur. The dark-brown dyeings have a good acid resistance, good levelling and penetration properties, good fastnesses to water, washing, perspiration, solvents, and to light, and perfect dyeability in hard water.

The novel dyestuffs dye boxcalf and box sides, if necessary in the presence of greasing and levelling agents, within 1 hour after impregnation with a liquor having a temperature of from 50° to 60° C. The dyestuff is then fixed by an after-treatment with formic acid.

Corrected grain is dyed by spraying with an ammonia-containing aqueous/ethanolic solution of the dyestuff which may contain a levelling agent in addition. In the case of normally absorbing leather, the dyestuff solution may be applied by means of a brush. After a 2 hours' milling, split suedes are dyed by impregnation for 2 hours with a solution of the dyestuff having a temperature of 55° C. and containing, if necessary, greasing and levelling agents in addition, and the dyestuff is then fixed with formic acid.

As compared to the dyestuffs indicated in German Pat. No. 904,229, the dyestuffs according to the invention are distinguished by a more yellowish shade, which is caused by component B and hitherto was difficult to realize altogether. With the use of the dyestuffs of the invention there are obtained furthermore full dark-brown dyeings on leather and fur without the decrease of tinctorial strength usually observed in the case of yellowish shades. After an aqueous/ammoniacal pre-treatment, fur suedes are dyed for 3 hours at 25° C., if necessary with addition of auxiliaries, and subsequently rinsed.

The following Examples illustrate the invention; parts and percentages being by weight unless otherwise stated.

EXAMPLE 1

31.9 Parts of 1-amino-8-naphthol-3,6-disulfonic acid are dissolved in 100 parts by volume of water and 10 parts by volume of 33% sodium hydroxide solution (pH of the solution about 8), and 15 parts by volume of 40% sodium nitrite solution are added to this solution. The mixture is then added dropwise at about 20° C. while stirring well to a mixture of 35 parts by volume of concentrated hydrochloric acid and 100 parts by volume of water. Stirring of the brown-yellow diazo suspension is continued for a further hour, and during this time an excess of nitrous acid must be present which subsequently is removed by addition of a small amount of solid amidosulfonic acid.

24.1 Parts of 3,3'-dihydroxy-diphenylamine are dissolved while stirring overnight with 200 parts by volume of water and 20 parts by volume of 33% sodium hydroxide solution. While stirring well, the diazo suspension obtained as indicated above is poured at 15°–20° C. into the alkaline solution of 3,3'-dihydroxy-diphenylamine, so that the reaction mixture has then a pH of about 5. By means of about 25 parts by volume of 33% sodium hydroxide solution, the pH is adjusted to 10.9, and stirring is continued for 1 hour at room temperature.

46.4 Parts of 4-nitro-4'-amino-diphenylamine-2-sulfonic acid are dissolved while stirring overnight at room temperature with 300 parts by volume of water and 15 parts by volume of 33% sodium hydroxide solution. 15 Parts by volume of 40% sodium nitrite solution are added to this solution, and this mixture is then added dropwise at about 20° C. to 35 parts by volume of concentrated hydrochloric acid and 50 parts by volume of water. Stirring is continued for a further hour, and the excess nitrous acid is removed with a small amount of solid amidosulfonic acid.

Subsequently, the diazo suspension of 4-nitro-4'-amino-diphenylamine-2-sulfonic acid so obtained is poured into the solution of the monoazo dyestuff, and stirring is continued for 1 hour at room temperature. A pH of about 6 is thus established. By addition of about 25 parts by volume of 33% sodium hydroxide solution the pH is adjusted at 15°–20° C. to 10.9, and stirring is continued for 1 hour at room temperature.

18.9 Parts of 1-(3'-aminophenyl)-3-methyl-5-pyrazolone are dissolved in 200 parts by volume of water and 20 parts by volume of 33% sodium hydroxide solution. To this solution, 15 parts by volume of 40% sodium nitrite solution are added, and the mixture is then added dropwise at 15°–20° C. to 35 parts by volume of concentrated hydrochloric acid and 50 parts of ice. Stirring is continued for 1 hour in the presence of excess nitrous acid, and the excess is subsequently removed by a small amount of solid amidosulfonic acid.

60 Parts of crystallized sodium acetate are added to the solution of the disazo dyestuff, and the diazo suspension of 1-(3'-aminophenyl)-3-methyl-5-pyrazolone is poured in while stirring well. The pH of the trisazo dyestuff solution is about 5 and is raised to 10.9 by adding about 25 parts by volume of 33% sodium hydroxide solution. Stirring is continued for 1 hour at room temperature. The solution so obtained is concentrated to dryness at 60° C. in a vacuum shelf drier. The grey powder dyes leather in full, dark-brown shades having good fastnesses.

EXAMPLE 2

When in Example 1 the 1-amino-8-naphthol-3,6-disulfonic acid is replaced by 31.9 parts of 1-amino-8-naphthol-4,6-disulfonic acid, and operations are as described until isolation of the trisazo dyestuff, a grey powder is obtained which dyes leather in dark-brown shades of good fastnesses.

EXAMPLE 3

When in Example 1 the 1-amino-8-naphthol-3,6-disulfonic acid is replaced by a mixture of 16.0 parts of 1-amino-8-naphthol-3,6-disulfonic acid and 16.0 parts of 1-amino-8-naphthol-4,6-disulfonic acid dissolved in 100 parts by volume of water and 15 parts by volume of 33% sodium hydroxide solution, and when operating as indicated until isolation of the trisazo dyestuff, a grey powder is obtained which dyes leather in dark-brown shades of good fastnesses.

EXAMPLE 4

31.9 Parts of 1-amino-8-naphthol-3,6-disulfonic acid are dissolved in 100 parts by volume of water and 10 parts by volume of 33% sodium hydroxide solution (pH of the solution about 8), and 15 parts by volume of 40% sodium nitrite solution are added to this solution. The mixture is then added dropwise at about 20° C. while stirring well to a mixture of 35 parts by volume of concentrated hydrochloric acid and 100 parts by volume of water. Stirring of the brown-yellow diazo suspension is continued for a further hour, and during this time an excess of nitrous acid must be present which subsequently is removed by addition of a small amount of solid amidosulfonic acid.

24.1 Parts of 3,3'-dihydroxy-diphenylamine are dissolved while stirring overnight with 200 parts by volume of water and 20 parts by volume of 33% sodium hydroxide solution. While stirring well, the diazo suspension obtained as indicated above is poured at 15°–20° C. into the alkaline solution of 3,3'-dihydroxy-diphenylamine, so that the reaction mixture has then a pH of about 5. By adding about 25 parts by volume of 33% sodium hydroxide solution, the pH is adjusted to 10.9, and stirring is continued for 1 hour at room temperature.

18.9 Parts of 1-(4'-aminophenyl)-3-methyl-5-pyrazolone are dissolved in 200 parts by volume of water and 20 parts by volume of 33% sodium hydroxide solution. To this solution, 15 parts by volume of 40% sodium nitrite solution are added, and the mixture is then added dropwise at 15°–20° C. to 35 parts by volume of concentrated hydrochloric acid and 50 parts of ice. Stirring is continued for 1 hour in the presence of excess nitrous acid, and the excess is subsequently removed by adding a small amount of solid amidosulfonic acid.

60 Parts of crystallized sodium acetate are added to the solution of the monoazo dyestuff, and the diazo suspension of 1-(4'-aminophenyl)-3-methyl-5-pyrazolone is poured in at 15°–20° C. while stirring well. The pH of the disazo dyestuff solution is about 5.5 and is raised to 10.9 by adding about 25 parts by volume of 33% sodium hydroxide solution. Stirring is continued for 1 hour at room temperature.

46.4 Parts of 4-nitro-4'-amino-diphenylamine-2-sulfonic acid are dissolved while stirring overnight at room temperature with 300 parts by volume of water and 15 parts by volume of 33% sodium hydroxide solution. 15 Parts by volume of 40% sodium nitrite solution are added to this solution, and this mixture is then added dropwise at about 20° C. to 35 parts by volume of concentrated hydrochloric acid and 50 parts by volume of ice. Stirring is continued for a further hour, and the excess nitrous acid is removed with a small amount of solid amidosulfonic acid.

Subsequently, the diazo suspension of 4-nitro-4'-amino-diphenylamine-2-sulfonic acid so obtained is poured into the solution of the disazo dyestuff, and stirring is continued for 1 hour at room temperature. By addition of about 25 parts by volume of 33% sodium hydroxide solution the pH is adjusted at 15°–20° C. to 10.9, and stirring is continued for 1 hour at room temperature. The solution of the trisazo dyestuff so obtained is concentrated to dryness at 60° C. in a vacuum shelf drier. The grey powder dyes leather in full, dark-brown shades having good fastnesses.

EXAMPLE 5

When in Example 4 the 1-amino-8-naphthol-3,6-disulfonic acid is replaced by a mixture of 16.0 parts of 1-amino-8-naphthol-3,6-disulfonic acid and 16.0 parts of 1-amino-8-naphthol-4,6-disulfonic acid dissolved in 100 parts by volume of water and 15 parts by volume of 33% sodium hydroxide solution, and operations are as in Example 4 until isolation of the trisazo dyestuff, a grey powder is obtained which dyes leather in dark-brown shades having good fastnesses.

EXAMPLE 6

When in Example 4 the 1-amino-8-naphthol-3,6-disulfonic acid is replaced by a mixture of 16.0 parts of 1-amino-8-naphthol-3,6-disulfonic acid and 16.0 parts of 1-amino-8-naphthol-4,6-disulfonic acid dissolved in 100 parts by volume of water and 15 parts by volume of 33% sodium hydroxide solution, and the 1-(4'-aminophenyl)-3-methyl-5-pyrazolone is replaced by 18.9 parts of 1-(3'-aminophenyl)-3-methyl-5-pyrazolone, and operations are as in Example 4 until isolation of the trisazo dyestuff, a grey powder is obtained which dyes leather in dark-brown shades of good fastnesses.

EXAMPLE 7

Dyeing of boxcalf, tanned with a commercial chrome tanning agent and neutralized with 0.4% of sodium acetate and 0.5% of sodium carbonate: A leather specimen having a shaved weight of 10 parts is dyed for 20 minutes at 55°–60° C. in an experimental "Wacher" glass drum in 15 parts by volume of water containing 0.10 part of one of the trisazo dyestuffs obtained according to one of the above Examples.

For greasing, 0.05 part of a mixture of alkanesulfonates with synthetic oil, 0.03 part of sulfurized neat's foot oil, 0.03 part of unsulfurized neat's foot oil, and 0.03 part of a synthetic leather oil on the basis of chlorinated hydrocarbons are used. After having greased for 30 minutes, the specimen is acidified with 0.05 part of 85% formic acid, subsequently rinsed and sammed. After drying at 60° C., a full, dark-brown dyeing of good fastnesses is obtained.

EXAMPLE 8

Example of a bath dyeing on sheepskin:

5.0 Parts of a dry sheepskin are pretreated for 1 hour at 35° C. in 150 parts by volume of water with 0.11 part of sodium salt of a fatty acid condensation product and 0.15 part by volume of 25% ammonia. The final pH must not be below 7.0 and not exceed 7.8, otherwise it must be corrected and neutralization be continued for 20 minutes. Subsequently, the goods are rinsed.

In a fresh bath, 0.11 part of sodium salt of a fatty acid condensation product, 0.05 part by volume of 25% ammonia and 0.11 part of a trisazo dyestuff obtained according to one of the Examples 1 to 6 are introduced and the fleece is dyed for 2 hours at 25° C., and acidified with 0.1 part of 85% formic acid. The dyeing bath should have a pH of 5.0 to 5.3. Subsequently, said skin is rinsed, sammed and dried at 60° C. A deep brown dyeing of the leather of the double face is obtained, while the hairy side is dyed only slightly.

What is claimed is:

1. A water-soluble trisazo-dyestuff of the formula

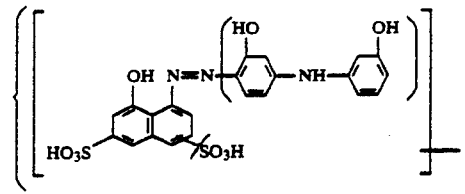

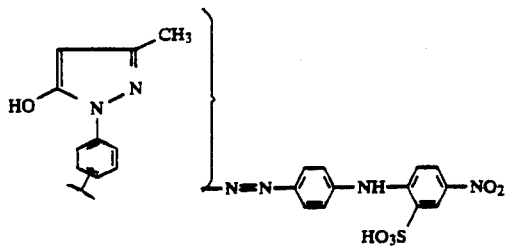

* * * * *